UNITED STATES PATENT OFFICE.

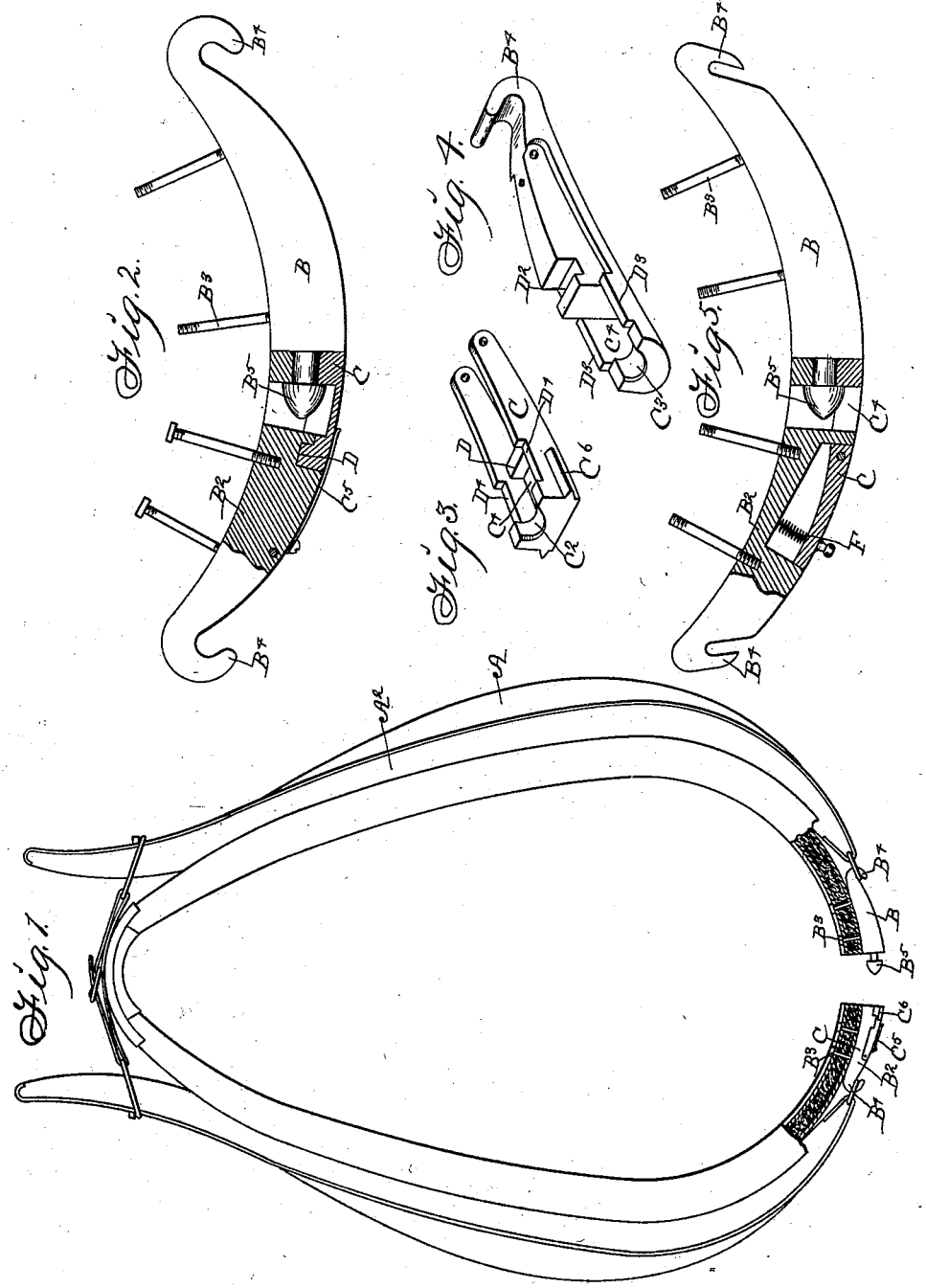

JAMES SNEBERG, OF KEOKUK, IOWA.

HORSE-COLLAR FASTENER.

SPECIFICATION forming part of Letters Patent No. 508,251, dated November 7, 1893.

Application filed January 31, 1893. Serial No. 460,275. (No model.)

*To all whom it may concern:*

Be it known that I, JAMES SNEBERG, a citizen of the United States of America, residing at Keokuk, in the county of Lee and State of Iowa, have invented an Improved Collar and Hame Fastener, of which the following is a specification.

The object of my invention is to provide a simple, cheap and durable device adapted to be permanently attached to a collar that is open at its lower end, and automatically connect the ends of the collar when brought together and also to connect the lower ends of the hames of a harness and secure the same to the collar, and to so construct the coupling device that the operative parts thereof will be protected from lateral or longitudinal strain.

My invention consists in details in the construction, arrangement and combinations of the parts of the coupling device and the combination thereof with a collar and hames as hereinafter fully set forth, pointed out in my claims and illustrated in the accompanying drawings, in which—

Figure 1 is a view of a horse's collar opened at its under side, having my improved coupling device connected therewith and a pair of hames upon the collar and attached to the coupling device, parts of the collar being broken away to show the connection of the coupling device, therewith. Fig. 2 is an enlarged detail side view of the coupling device with portions broken away to show its interior construction. Figs. 3 and 4 are enlarged detail perspective views of detached portions of the coupling device, and Fig. 5 is an enlarged detail side view of a modified form of coupling device.

Referring to the accompanying drawings the reference letter A is used to designate a horse's collar that is open at its under end portion. $A^2$ designates a pair of hames of the ordinary kind adapted to be fitted to said collar.

B and $B^2$ designate respectively the two portions of the coupling device. They are curved to conform to the shape of the collar to which they are permanently connected by means of the bolts $B^3$. In the outer end of each section of the coupling device is formed a hook $B^4$ to provide means whereby the hames may be detachably connected therewith. On the inner end of the section B is formed a hook $B^5$ having a rounded or wedge-shaped head and a small neck. The section $B^2$ is adapted to receive this hook $B^5$ and securely hold it by being constructed as follows:

C designates a device hinged to the section $B^2$ with its sides overlapping the sides of said section $B^2$ which are milled out to receive them, and its forward end forming the lower half of the inner end of the section $B^2$. The inner ends of each of the parts $B^2$ and C are provided with openings $C^2$ and $C^3$ adapted in size and shape to encircle the neck of the hook $B^5$ when the sections $B^2$ and C are brought together.

$C^4$ is a cavity in the rear of the openings $C^2$ and C adapted to admit and hold the head of the hook $B^5$ when the sections $B^2$ and C are brought together.

$C^5$ designates a leaf spring secured to the outer face of the section $B^2$ and impinging the section C, to normally hold the two sections $B^2$ and C together and at the same time allow the wedge-shaped head of the hook $B^5$ to enter between said sections by forcing them apart until the head reaches the cavity $C^4$ when the sections will be brought together by said spring and $C^6$ designates lugs formed on or fixed to the sides of the section C to provide means whereby the sections may be drawn apart.

In order to preclude the possibility of longitudinal strain upon the hinge of the section C, I have provided a square shouldered integral lug D on the inner face of the section C to enter a notch $D^2$ in the section $B^2$ and also two lugs $D^3$ on the opposite sides of the section $B^2$ to enter corresponding notches in the section C.

In the modification shown in Fig. 5 the section C is pivoted in its central portion and its rear end is adapted to enter a slot in the section $B^2$ when opened and a coil spring F is interposed between the outer end of the section $B^2$ to normally hold them separated and the jaws at their inner ends closed.

In practical operation the hames are connected with the hooks $B^4$ and secured to the collar by straps at their tops. The lower end of the collar is opened to encircle a horse's neck, and when placed thereupon the ends of the collar are brought together and automatically coupled by means of the coupling device, and when it is desirable to open the collar the movable section C may be raised to release the hook $B^5$ by grasping the lugs $C^6$.

Having thus described the device, what I claim as my invention, and desire to secure by Letters Patent of the United States therefor, is—

1. An improved collar and hames fastener comprising the following elements, to wit: two sections B and $B^2$ adapted to be secured to the ends of a collar, a projection $B^5$ having an enlarged head and an annular shoulder formed thereon as set forth, a jaw C hinged to the remaining section and having the parallel side pieces adapted to overlap the sides of the said section for the purposes stated, cavities formed in both said jaw and section, to admit the said projection and engage the annular shoulder thereof for the purposes stated.

2. An improved collar and hames fastener comprising the following elements, to wit: two sections B and $B^2$, adapted to be secured to the ends of a collar, and provided with hooks $B^4$ at their outer ends, a hook $B^5$ formed on the inner end of one section, a spring actuated jaw C hinged to the section $B^2$, a cavity $C^4$ formed in the sections $B^2$ and C to admit and hold the hook $B^5$ and a lug D formed on the section C adapted to enter a notch $D^2$ formed in the section $B^2$ for the purposes stated.

3. An improved collar and hames fastener comprising the following elements, to wit: sections B and $B^2$ secured to the ends of a collar, and provided with hooks $B^4$, at their outer ends, a hook $B^5$ formed on the inner end of one section, a spring actuated jaw C hinged to the section $B^2$ with its sides overlapping the ends of the sections $B^2$ as set forth a cavity $C^4$ formed in the sections $B^2$ and C to admit and hold the hook $B^5$ as set forth a lug D formed on the section C adapted to enter a notch $D^2$ formed in the section $B^2$ two lugs $D^3$ formed on the section $B^2$ to enter notches $D^4$ in the section C all arranged and combined substantially in the manner set forth and for the purposes stated.

4. In combination with a horse collar that is open at its lower end, two sections B and $B^2$ secured to the meeting ends thereof, and having hooks $B^4$ at their outer ends, the hames $A^2$ detachably connected with hooks and strapped to the collar, a hook $B^5$ formed on the inner end of one section, a spring actuated jaw C hinged to the section overlapping the sides of said section $B^2$, a cavity $C^4$ formed in the sections $B^2$ and C to admit and hold the hooks $B^5$ as set forth, a lug D formed on the section C adapted to enter a notch $D^2$ formed in the section $B^2$, two lugs $D^3$ formed on the section $B^2$ to enter notches $D^4$ in the section C all arranged and combined substantially in the manner set forth for the purposes stated.

JAMES SNEBERG.

Witnesses:
MATHIAS RIBYN, Sr.,
JOSEPH REIMERS.